United States Patent [19]

Morel

[11] 4,278,207
[45] Jul. 14, 1981

[54] BREAKING MACHINE WITH AUTOMATIC RECYCLING OF THE FIBRES AND THE PROCESS FOR ITS OPERATION

[76] Inventor: Andre Morel, La Croix du Mont, Cours (Rhone), France

[21] Appl. No.: 25,477

[22] Filed: Mar. 30, 1979

[30] Foreign Application Priority Data

Mar. 30, 1978 [FR] France .................. 78 10003

[51] Int. Cl.³ .................. B02C 13/286; B02C 25/00
[52] U.S. Cl. .......................................... 241/4; 241/29; 241/34; 241/52; 241/186 R
[58] Field of Search .................... 241/4, 27, 29, 30, 33, 241/34, 37, 52, 60, 61, 80, 154, 158, 160, 186 R, 186.4

[56] References Cited

U.S. PATENT DOCUMENTS

| 2,535,570 | 12/1950 | Gordon | 241/34 |
| 3,148,839 | 9/1964 | Danforth | 241/261.1 |

Primary Examiner—Richard B. Lazarus
Attorney, Agent, or Firm—Remy J. VanOphem

[57] ABSTRACT

A breaking machine having a disintegrator module, storage shaft, and a regulating shaft. Fibers are fed into a disintegrator module of the breaking machine and are thereafter led into a storage shaft. At this point, the fibers are alternatively exited from the machine or fowarded to a regulating shaft for recycling to the disintegrator module. The cycle may be reproduced several times and is automatically controlled by a control panel where preselected digital values are set to control the operation and cycling of the machine.

12 Claims, 12 Drawing Figures

BREAKING MACHINE WITH AUTOMATIC RECYCLING OF THE FIBRES AND THE PROCESS FOR ITS OPERATION

BACKGROUND OF THE INVENTION

The present invention concerns a breaker with automatic recycling of the fibres, and its method of operation.

DESCRIPTION OF THE PRIOR ART

At present, in the textile industry, fibres and waste undergo preliminary opening up or reconditioning and mixing operations, before being used in the traditional manner. These operations of opening up and reconditioning are generally carried out on machines commonly called openers or breakers. These machines are composed principally of a series of disintegrator-drums with spikes intended to separate the fibres. The disintegrating operations necessitate the use of several disintegrator-drums over which the fibres pass successively. From this it results that the known machines occupy a large floor space, and overall are very bulky.

SUMMARY OF THE INVENTION

The invention has the aim of achieving a breaker which is less bulky than the known machines, but which, however, allows results similar to those obtained with traditional machines to be achieved.

A breaker according to the invention comprises at least one breaking module into which the fibres to be treated are led by a feed device on to a spiked disintegrator-drum, and it is characterised in that it comprises in addition:

a device for layering the fibres comprising a perforated drum of which the interior space is maintained in depression by means of a suction mechanism, this fibre layering device being located separate from the breaking module, a suction channel to conduct the fibres from the breaking module to the layering device, a storage shaft which extends below the fibre layering device to receive the fibres coming from the said fibre layering device, a vertical regulating shaft which receives at its upper end the fibres coming from the storage shaft, at least one conveyor belt which picks up the fibres at the bottom of the regulating shaft to carry them towards the feed device of the disintegrator module, a central controlling device which regulates the different components of the machine.

According to an additional characteristic of the invention, the feed device of the disintegrator module comprises a drive system with a speed regulator which is controlled by the central control device, and which simultaneously drives on the one hand a roller of supple material which revolves against the concave surface of a trough forcing the fibres to pass between the said roller and the trough, and on the other hand a feed conveyor belt which leads the fibres between the said roller and the trough.

According to an additional characteristic of the invention, the supple roller and the trough of the disintegrator module feed device are mounted on a carriage able to move nearer or further away from the spiked disintegrator-drum, the movements of the carriage being regulated by means of a drive device which is itself directly controlled by the central control device.

According to an additional characteristic of the invention, the carriage drive device comprises:

two horizontal and parallel slideways at right angles to the axis of the disintegrator-drum;

two nuts situated some distance apart and both fixed to the carriage;

two screws parallel to the slideways, each engaged in one of the two nuts fixed to the carriage, and fixed so as to be unable to move in an axial direction;

a transmission shaft attached to two worm screws each engaging with a gear which is fixed to one of the two screws parallel to the slideways;

a reversible motor able to drive the said transmission shaft.

According to an additional characteristic of the invention, the regulating shaft comprises means of varying the area of the passage open to the fibres, the said means being controlled directly by the central control device, in order to vary as required the thickness of the layer of material directed on to the conveyor belt passing below the regulating shaft.

According to an additional characteristic of the invention, the means of varying the area of the passage open to the fibres in the regulating shaft comprise a movable wall which is displaced so as to approach or move away from a fixed wall, between two other fixed walls, these four walls forming together the said passage of which the lower end opens opposite at least two delivery rollers rotating on horizontal axes located above the conveyor belt, the central control device being connected to a detector cell which sends a signal when the fibres accumulate above a certain level in the said passage of the regulating shaft.

According to another characteristic of the invention, the regulating shaft is located below the storage shaft.

According to a variant of the invention, the regulating shaft is located above the disintegrator module, so that it directs the fibres straight on to the conveyor belt feeding the said disintegrator module.

According to another variant of the invention, the regulating shaft is located above the disintegrator module but away from the storage shaft, a suction channel carrying out the transportation of the fibres from the bottom of the storage shaft to the top of the regulating shaft, where there is another layering device.

According to an additional characteristic of the invention, the storage shaft carries at its lower end;

at least two delivery rollers on horizontal axes placed side by side across the passage of the fibres;

at least two drawing rollers on horizontal axes placed side by side below the delivery rollers across the passage of the fibres.

According to an additional characteristic of the invention, the storage shaft carries at its upper end a swinging shutter operated by a double-action jack, the said shutter being able to move between a first position in which the fibres coming from the disintegrator module through the layering device fall inside the storage shaft, and a second position in which the fibres coming from the disintegrator module through the layering device are evacuated out of the machine.

A process according to the invention for the operation of a breaker with automatic recycling of the fibres is characterised in that it comprises the following successive phases:

the automatic location of the mobile carriage of the disintegrator module according to the size of the spacing between the disintegrator cylinder and the mobile carriage which is predetermined for the first passage of the fibres;

the starting of the drive device of the disintegrator module at a speed predetermined for the first passage of the fibres;

the location of the raw material to be treated on the feed conveyor belt of the distintegrator module;

the aspiration of the fibres having undergone disintegration into the suction channel which leads these fibres into the layering device located above the storage shaft;

the layering of the fibres and the output of these fibres into the upper part of the storage shaft, the swinging shutter of the storage shaft being in the position to allow this shaft to be filled;

the filling of the storage shaft, the delivery and drawing rollers of this shaft being at rest;

when the upper level of the fibres accumulated in the storage shaft reaches a detection cell provided in the storage shaft, the automatic setting of the size of the passage open to the fibres in the regulating shaft, and the starting of the delivery and drawing rollers in the storage shaft;

the filling of the regulating shaft up to the level of its detection cell, after which the delivery and drawing rollers of the storage shaft are stopped;

the movement of the fibres on to the feed conveyor belt of the disintegrator module;

the checking of the arrival of the fibres on the said feed conveyor belt of the disintegrator module by means of a detection cell;

the stopping of the drive system of the disintegrator module before the layer of fibres arrives at the supple roller of the disintegrator module;

the automatic location of the mobile carriage of the disintegrator module according to a size of spacing between the disintegrator-drum and the mobile carriage predetermined for the second passage of the fibres;

the starting of the drive device of the disintegrator module at a speed predetermined for the second passage of the fibres;

the same phases as for the first passage of the fibres, the working time being predetermined by means of an adjustable timing device;

at the end of the time given by the timer, the stopping of the disintegrator module drive system and the location of all the settings relative to the third passage of the fibres through the machine;

the re-starting of the disintegrator module drive system and the setting of the swinging shutter of the storage shaft into the position which allows the fibres to be evacuated out of the machine;

when the fibres are completely evacuated from the machine, the stopping of the disintegrator module drive system.

BRIEF DESCRIPTION OF THE DRAWING

The attached drawing, given by way of non-limiting example, will allow the characteristics of the invention to be better understood.

DETAILED DESCRIPTION OF THE PREFERRED EMBODIMENT

Figure 1:
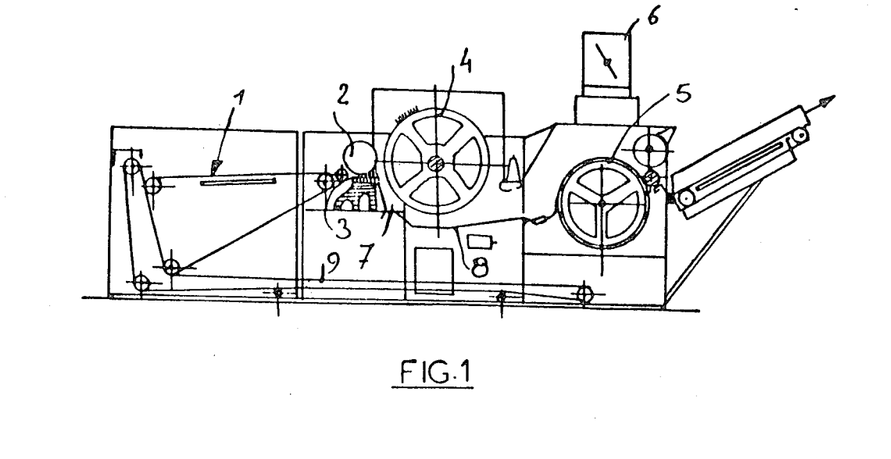
FIG. 1 is a diagrammatic view of a vertical section of a breaker of known type.
Figure 2:
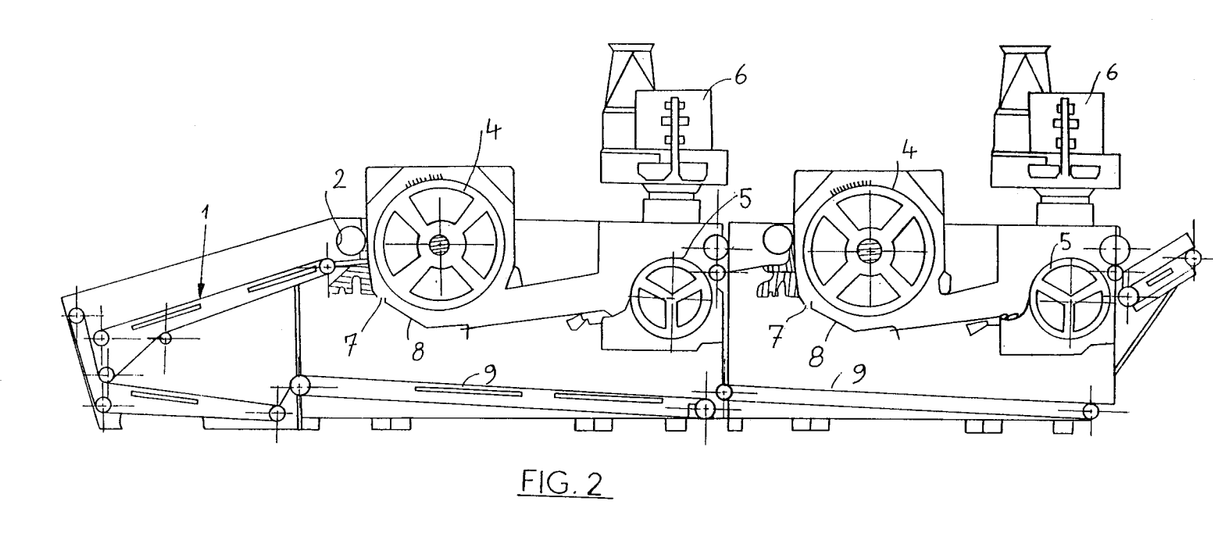
FIG. 2 is a diagrammatic view of a vertical section of a breaker of another known type.
Figure 3:
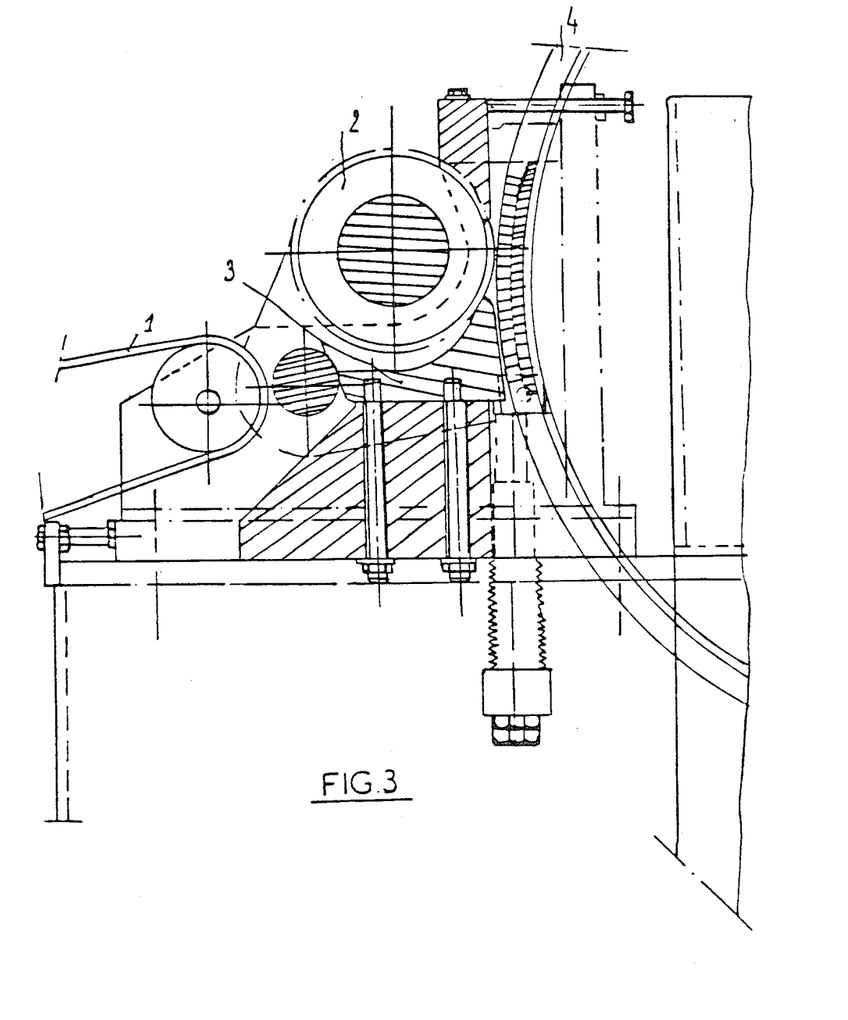
FIG. 3 is a part view to a larger side of FIG. 1 showing the feed device of the breaker.

According to an arrangement illustrated in FIGS. 1 to 3, it must be recalled that an opener or breaker of the traditional type comprises an assembly of opening modules, each module essentially comprising:

a feed conveyor belt 1;

a feed device comprising a roller 2 covered with segments of rubber working against a fixed trough 3;

a spiked disintegrator-drum 4;

a layering device for the correctly worked fibres comprising a perforated drum 5 of which the interior space is kept in depression by a suction device 6.

The material which is insufficiently disintegrated is eliminated owing to a passage 7 provided before a selection plate 8 and is recycled automatically on to the conveyor 1 by means of a conveyor belt 9.

On these machines, the intensity and the quality of the disintegration depend essentially on three parameters, namely:

the linear speed of the conveyor belt 1 and of the roller 2;

the distance between the spiked drum 4 and the fixed trough 3;

the thickness of the layer of material spread on the conveyor 1.

These parameters, which are regulable, depend on the nature of the fibres to be worked and the quality of the produce to be obtained. For the majority of the fibres to be worked, it is absolutely essential to plan for several successive passages over spiked drums. In the known modern machines, the number of feed systems, spiked drums and layering devices has therefore been multiplied, the layer of fibres passing automatically from one spiked drum to another without manual intervention.

The present invention has the main aim of allowing several passages of the fibres through the same disintegrator module, the handling of the fibres and the setting changes appropriate to each passage of the fibres being carried out entirely automatically.

Figure 4:
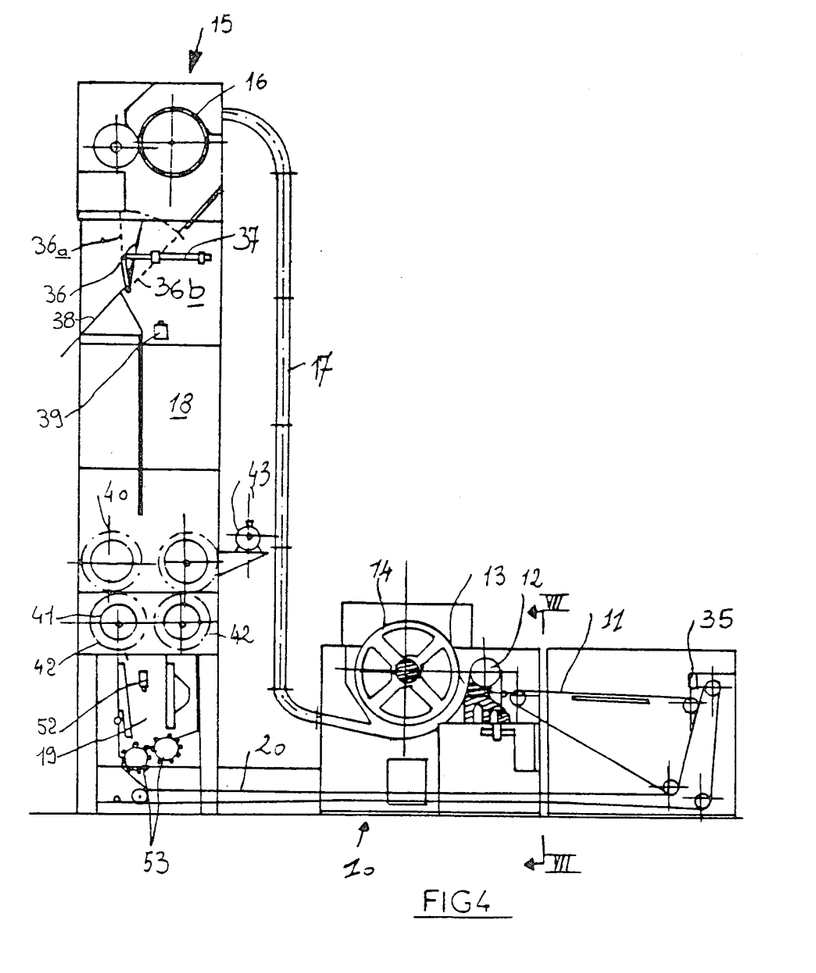
FIG. 4 is a diagrammatic view of a vertical section of a breaker according to the invention.

There is shown in FIG. 4 a machine according to the invention. This machine essentially comprises:

a disintegrator module 10 in which the fibres to be treated are carried by a feed device comprising a conveyor belt 11, a supple roller 12 and a trough 13 to a spiked drum 14;

a fibre layering device 15, which comprises a perforated drum 16, of which the internal space is kept in depression by means of a suction device, and which is remote from the disintegrator module 10;

a suction channel 17 to carry the fibres from the disintegrator module to the layering device 15;
a storage shaft 18, which extends below the layering device 15 to receive the layered fibres;
a regulating shaft 19 placed below the storage shaft 18;
a conveyor belt 20 which collects the fibres from the bottom of the regulating shaft 19 to carry them towards the feed device of the disintegrator module;
a central control device which regulates the different components of the machine.

These different parts of the machine will now be described in greater detail.

Figure 6:
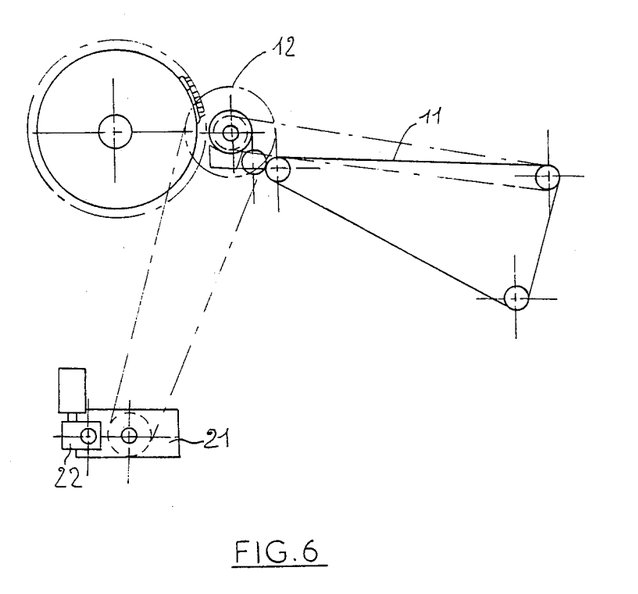
FIG. 6 is a part view on a larger side of FIG. 4 showing the disintegrator module drive system.

As may be seen in FIG. 6, the supple roller 12 and the conveyor 11 are driven by a single system of reduction drive with a speed regulator 21, itself fitted with a controlling servo-motor 22. The servo-motor 22 controls the variation of speed in relation to information received directly from the central controlling device.

Figure 7:
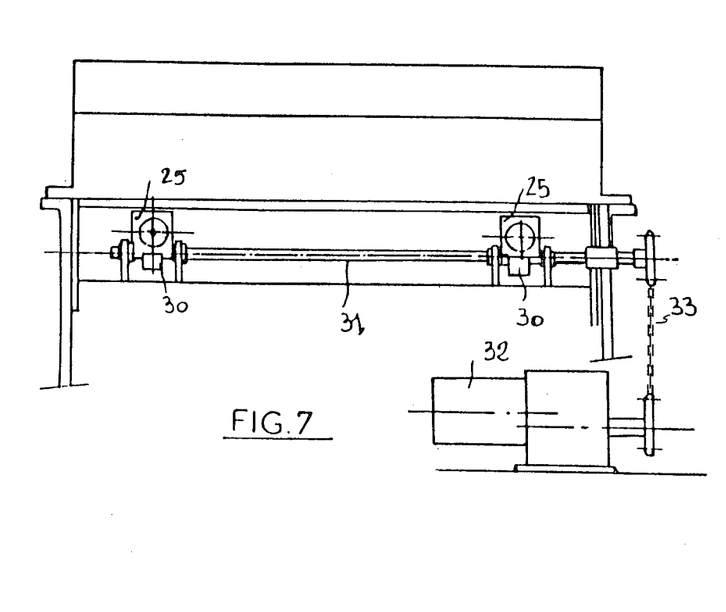
FIG. 7 is a view taken along line VII—VII in FIG. 4.
Figure 8:
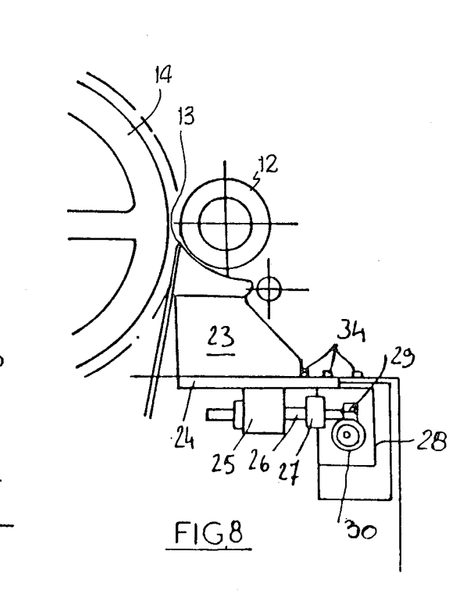
FIG. 8 is a part view on a larger scale of FIG. 4 showing the disintegrator module feed device.

Referring now to FIGS. 7 and 8, it will be seen that the supply roller 12 and the trough 13, against the concave surface of which the roller 12 revolves, are mounted on the same movable carriage 23 carried on two slideways 24 which are horizontal and at right angles to the axis of the spiked drum 14. The carriage 23 is fixed to two nuts 25 separate from each other and each engaged on a screw 26 parallel to the slideways 24, the two screws 26 being supported by bearings 27 which prevent their moving in an axial direction. The bearings 27 are fixed to a cross-piece 28 attached to the frame of the machine. Each screw 26 carries a gear 29 which engages with a worm 30 fixed to a transmission shaft 31 common to the two worms 30, and parallel to the axis of the drum 14. The transmission shaft 31 is driven by a reduction drive 32 by means of a chain 33. Since the reduction drive 32 is reversible, its operation allows displacement of the carriage either towards or away from the spiked drum 14. Three position detectors 34 connected to the central device allow the exact position of the carriage 13 to be permanently controlled.

The disintegrator module 10 carries in addition a detection cell 35 placed above the conveyor 11 (FIG. 4). This detection cell is connected to the central control device and to an electronic timing device of which the operation will be described later.

The storage shaft 18 comprises at its upper end a pivoting shutter 36 operated by a double-acting pneumatic jack 37. The shutter 36 may be moved between two extreme positions, namely:
a position in which the fibres coming from the disintegrator module 10 through the layering device 15 fall into the storage shaft 18 (position 36a); and
a position in which these fibres are evacuated out of the machine passing over an inclined section 38 (position 36b).

A detection cell 39 placed in the upper part of the storage shaft 18, just below the pivoting shutter 36, is connected to the central control device in order to send out a signal when the upper level of the fibres accumulated in the shaft 18 rises as far as this cell 39.

Two delivery rollers 40 and two drawing rollers 41 are provided at the lower end of the storage shaft 18, all having horizontal axes. The two delivery rollers 40 are placed side by side across the passage of the fibres. The two rollers 41 are placed side by side just below the rollers 40 but are nearer to each other than are these rollers 40. Each drawing roller 41 is surrounded on the outside by a semi-cylinder wall 42. The rollers 40 and 41 are driven by an electric motor 43.

Figure 9:
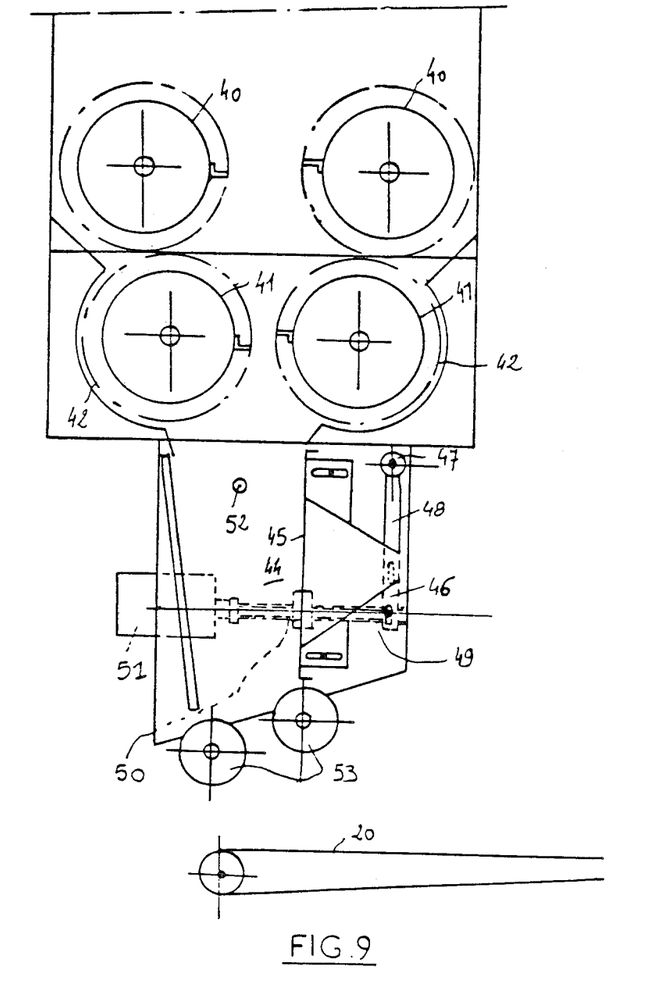
FIG. 9 is a part view on a larger scale of FIG. 4 showing in particular the regulating shaft.

In the regulating shaft 19 the passage open to the fibres is defined by three fixed walls 44 and a movable wall 45 (FIG. 9). The movements of the wall 45 are controlled by means of connectingrods 46 attached to a shaft 47 and pivoted to the wall 45. The shaft 47 is likewise attached to a lever 48 on the end of which is mounted the end of a screw 49 engaged in a fixed nut 50. A reduction drive 51 drives the screw 49 in rotation. This reduction drive is subject to the central control device to turn the screw 49 in either direction and move the movable wall 45 either towards or away from the wall 44 which is opposite to it.

A detection cell 52 situated in the upper part of the regulating shaft is connected to the central control device to send out a signal when the upper level of the fibres accumulated in the regulating shaft 19 rises to this cell 52.

Two delivery rollers 53 are placed horizontally side by side in the lower part of the shaft 19 across the path of the fibres.

Figure 5:
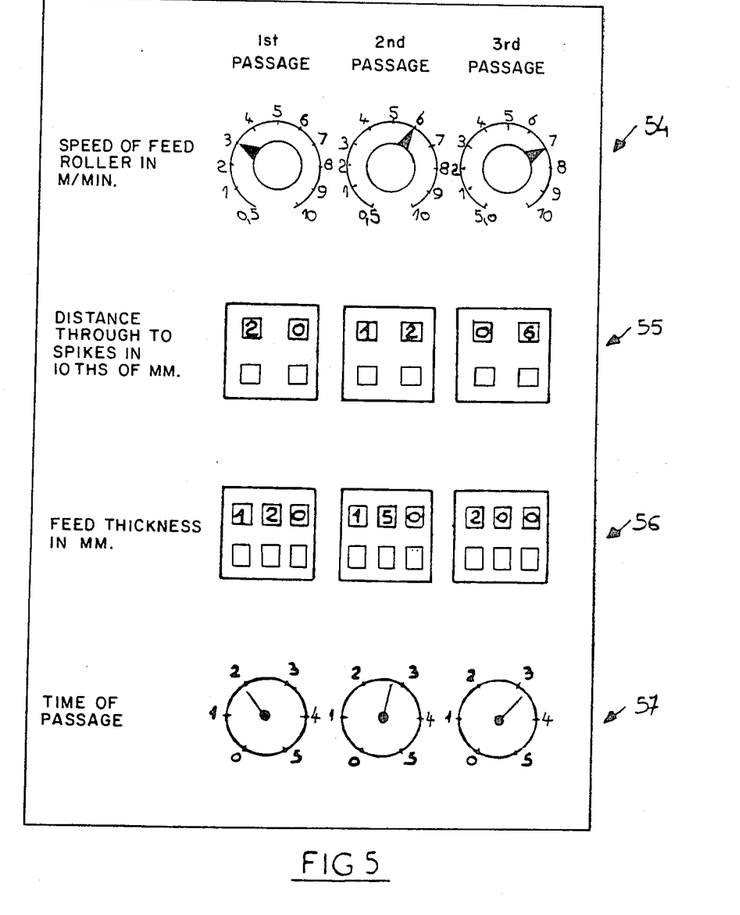
FIG. 5 is a front view of the control panel of this machine.

There is shown in FIG. 5 the control panel of the central control device. This panel comprises:
rotary selectors 54 by means of which the regulation of the speed of the reduction drive 32 is set by pre-selection.
digital setting devices 55 on which the pre-selected sizes corresponding to the position of the carriage 23 are set.
digital setting devices 56 on which pre-selected sizes for the thickness of the layer of fibres on the conveyor belt 11 are set.
rotary selectors 57 by means of which the lengths of the passage time of the fibres for one cycle of the machine are set.

As many sets of selectors 54 and 57 and setting devices 55 and 56 are provided as there are cycles: here the machine is designed for three cycles.

The operation is as follows

The material to be reconditioned is spread manually on the conveyor belt 11 (FIG. 4), to be led towards the feed system comprising the rubber roller 12 which works pressing against the concave surface of the trough 13. Thus carried perfectly spread across the full width of the machine, the layer of material squeezed between the roller 12 and the trough 13 is presented to the action of the disintegrator-drum 14. The fibres are then sucked into the pipe 17, owing to the depression created by the suction device which puts the interior of the perforated drum 16 in depression. The layer of disintegrated material which forms on the drum 16 falls into the storage shaft 18 when the shutter 36 is in the position 36a. The detection cell 39 checks the level of material in the shaft 18.

The fibres are then fed into the regulating shaft 19 owing to the action of the delivery rollers 40 and the drawing rollers 41. The cell 52 checks the level of material in the shaft 19, if need be, stopping the motor 43 which drives the rollers 40 and 41.

The lower conveyor belt 20 receives the layer of fibres delivered by the rollers 53 and carries it between the conveyors 11 and 20 on to the feed conveyor 11 which presents this layer of fibres for a second passage over the drum 14. The arrival of the layer of fibres on the feed belt 11 is detected by the cell 35. By regulating the position of the movable wall 45 of the regulating shaft 19 the thickness of the layer of material delivered on to the belt 11 may be varied as required.

The speed of the roller 12, the distance between the trough 13 and the spiked drum 14, as well as the width of the shaft 19 may be carefully chosen for each passage of the fibres.

For this purpose, an electronic or electro-mechanical device situated in the central control device allows the pre-selection for each passage of the fibres of:

the supply speed in meters per minute by means of the selectors 54;

the distance between the trough 13 and the drum 14 by means of the devices 55, these values being given in 10ths of millimeters;

the thickness of the layer of material in millimeters, by means of the devices 56.

The selectors 54 allow the speed of the roller 12 and the conveyor 11 to be chosen precisely.

The speed of the delivery rollers 53 being in direct relationship to that of the conveyor belt 20, the thickness of the layer of material delivered can vary only with the width of the shaft 19.

The disintegrator cylinder 14 must turn continuously whatever the operations of the cycle may be.

When the fibres must pass three consecutive times through the machine, the phases of operation are as follows:

(a) the automatic location of the carriage 23 carrying the roller 12 and the trough 13 according to the value selected by means of the device 55 corresponding to the first passage.

(b) the starting of the variable drive 21 (FIG. 6), which must operate at the speed selected by means of the device 54 corresponding to the first passage.

(c) the supply of raw material which is placed on the feed conveyor 11 in order to be disintegrated by means of the cylinder 14.

(d) the suction of the fibres into the pipe 17.

(e) the formation of the layer on the perforated drum 16 and the falling of the fibres into the storage shaft 18.

(f) the filling of the storage shaft 18, the rollers 40 and 41 being at rest.

(g) at the level of material corresponding to the detection cell 39, the automatic setting of the width of the regulating shaft according to the value selected by means of the device 56 corresponding to the first passage, and the starting of the rollers 40 and 41.

(h) the filling of the regulating shaft 19 until the upper level of the fibres reaches the detection cell 52, which stops the rollers 40 and 41.

(i) the rollers 53 being controlled at the same time as the conveyor 20, the carrying of the fibres on the conveyor belt 20 on to the conveyor belt 11.

(j) the checking of the arrival of material on the conveyor belt 11 by the detection 35.

(k) the stopping of the conveyor belt and the roller 12 when the layer of fibres arrives level with the roller 12, from the information given by the cell 35, the delay time between the moment of information and the moment of stopping being set by means of an electronic, electrical or mechanical timing device, and corresponding to the time necessary for the layer of material to move from the cell 35 to the roller 12.

(l) the location of the carriage 23 according to the value selected by means of the device 55 corresponding to the second passage.

(m) the starting of the variable drive 21 at the speed selected by means of the device 54 corresponding to the second passage.

(n) the following phases are carried out in the same way as in the first passage, but the working time is given by a timer according to the setting selected by means of the selector 57 corresponding to the second passage.

(o) when the timing device gives the signal for the end of the second passage, the variable drive 21 stops and the different settings are adjusted in relation to the values pre-selected for the third passage.

(p) at the moment of re-starting of the variable drive 21, the shutter 36 is carried to the position 36b, and the material which has just been worked for the third time is evacuated out of the machine by means of the inclined section 38.

(q) when the layer of fibres of the second passage is completely evacuated, the cell 35 causes the stopping of the variable drive 21 with a delay corresponding to the time taken for the last fibres to be ejected.

Figure 10:
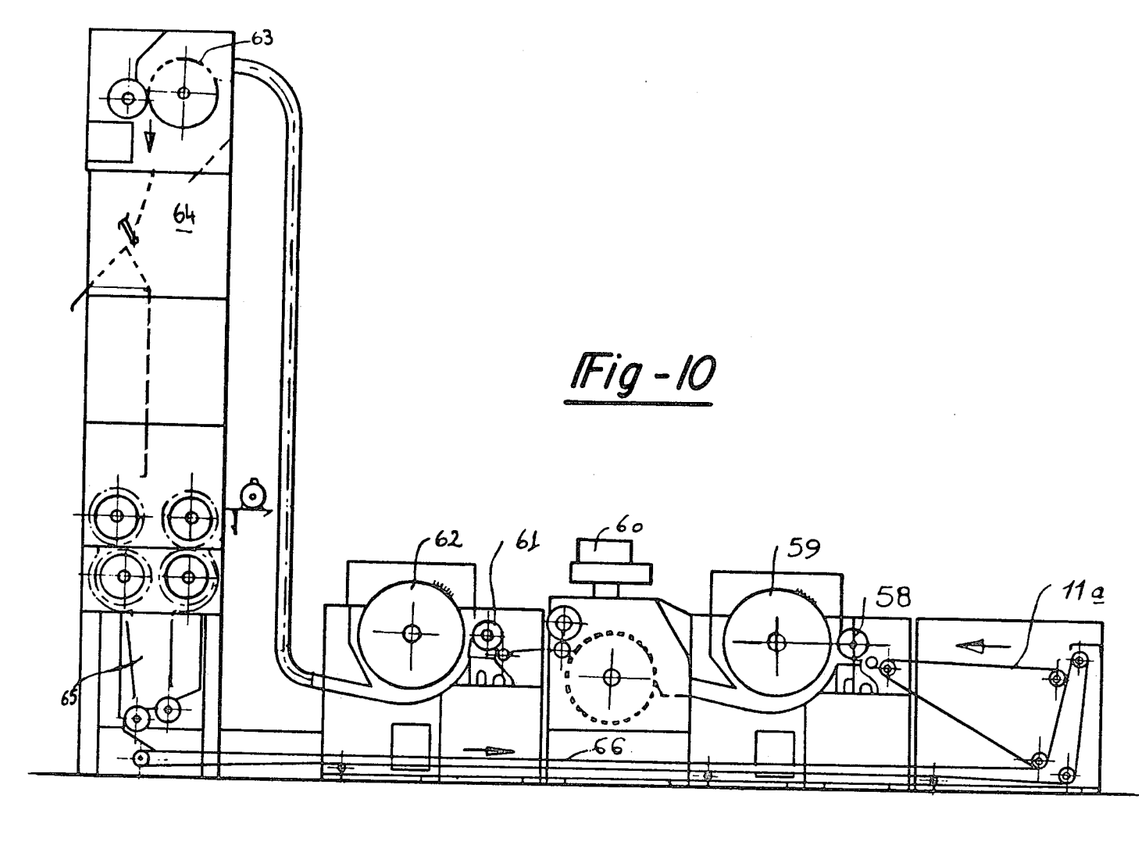
FIGS. 10, 11 and 12 are diagrammatic views of vertical sections of breakers according to variants of the invention.

For material needing more than three successive passages over the spiked cylinder 14, provision may be made for four, five or six successive automatic passages. However, it is preferable to reduce the number of cycles by adding one or several additional spiked cylinders. FIG. 10 shows a machine made in accordance with this variant.

The machine in FIG. 10 comprises:

a feed belt 57.

a feed device 58 comprising a pressure roller and a trough.

a first disintegrator cylinder 59.

a transport and layering device 60.

another feed device 61.

a second disintegrator cylinder 62.

a layering device 63 identical to the device 15 of FIG. 4.

a storage shaft 64 identical to the shaft 18 of FIG. 4.

a regulating shaft 65 identical to the shaft 19 of FIG. 4.

a lower conveyor belt for recycling 66 identical to the belt 20 of FIG. 4.

Figure 11:
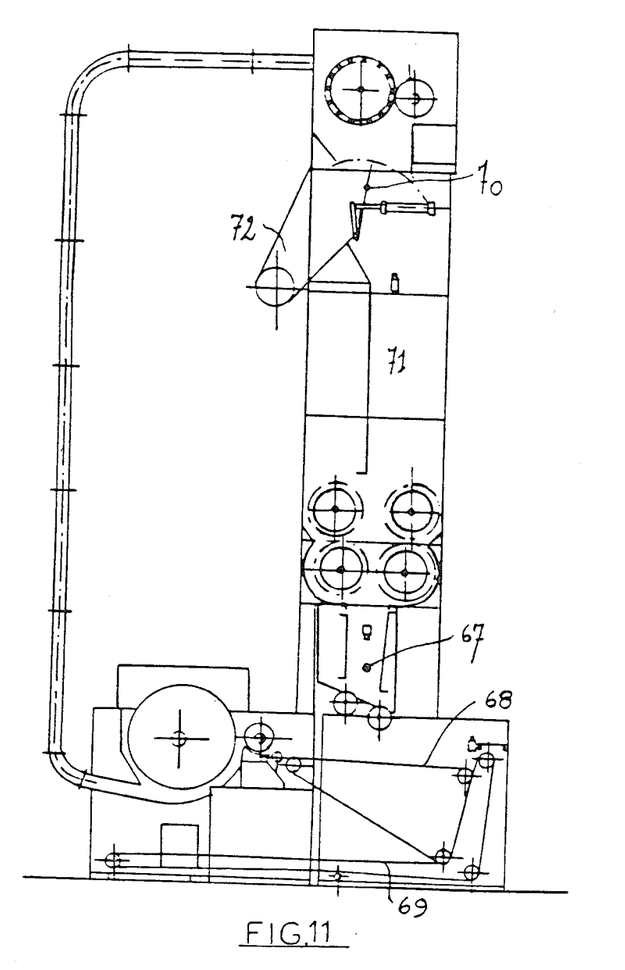

According to another variant shown in FIG. 11, a regulating shaft 67 is placed directly above the feed belt 68 of the disintegrator module. The lower transporter belt 69 is no longer used in the normal cycle. The evacuation of the fibres by the operation of a shutter 70 of the storage shaft 71 can no longer be carried out by gravity. In place of the inclined section 38 there is provided a hopper 72 connected to a pneumatic transport device.

Figure 12:
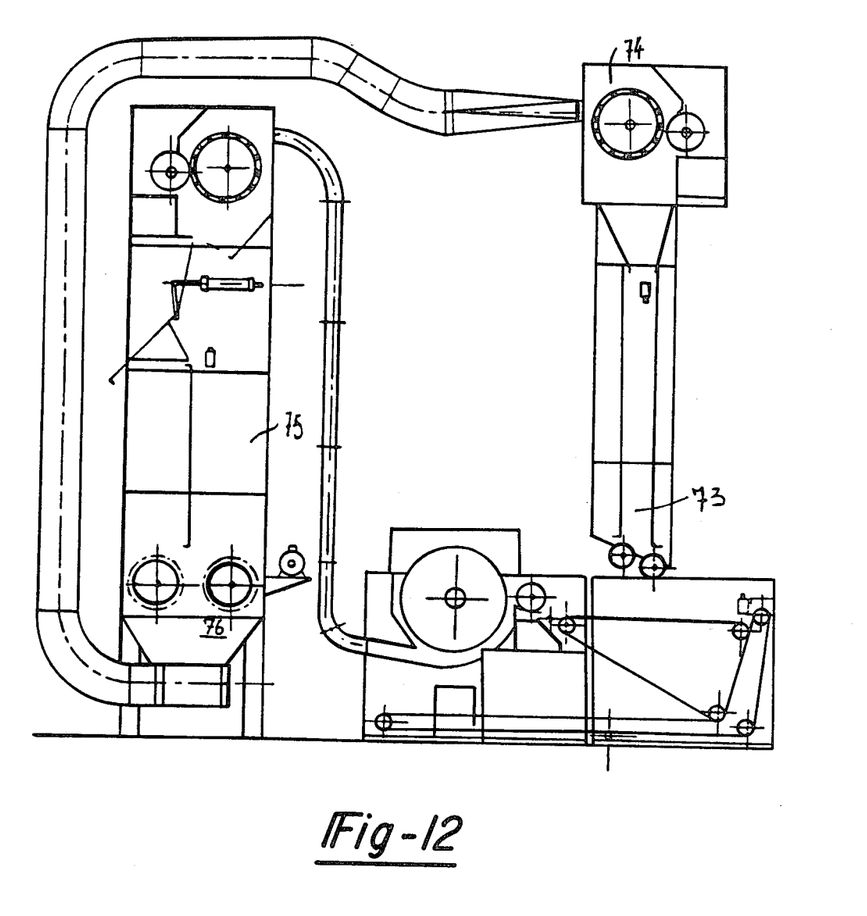

Since this latter arrangement is fairly tall, the storage shaft and the regulating shaft may be separated as in the case of the variant shown in FIG. 12. In this case the regulating shaft 73 is fed by a layering device 74, and the pneumatic transport is carried out at the lower end of the storage shaft 75 by a hopper 76 which collects the material delivered by the rollers.

In all cases, a device for separating insufficiently opened material may be placed below the spiked cylinder or cylinders. Insufficiently opened fibres are eliminated by this system then collected by the lower conveyor belt which carries them back to the feed conveyor belt.

The machine according to the invention has the main advantages in that it allows reduction of:

the amount of capital investment, since the machine is much simpler than normal machines;

the floor space occupied, since the number of disintegrator modules is reduced;

the power consumed, since the number of rotating drums is reduced.

I claim:
1. A breaking machine for treating fibers, said machine comprising:
   means for feeding fibers into said module;
   at least one disintegrator module having a spiked disintegrator drum for disintegrating fibers fed into said feeding means;
   means for layering said fibers, said layering means located separate from said disintegrator module, said layering means further comprising a perforated drum; and means for suction engaging said perforated drum to maintain a lower pressure inside said drum than outside said drum;
   passage means disposed between said disintegrator module and said layering means, said passage means carrying said fibers from said module to said layering means for layering the disintegrated fibers;
   storage means positioned adjacent said layering means for receiving said fibers from said layering means;
   regulating means positioned near said storage means for receiving fibers from said storage means and regulating said fibers;
   means for conveying said fibers, said conveying means disposed between said regulating means and said disintegrator module, said conveying means carrying said fibers from said regulating means to said module; and
   control means connected to all of said feeding means, disintegrator module, layering means, passage means, storage means, regulating means, and conveying means for controlling said module and all of said means so as to allow a predetermined number of successive automatic passes of said fibers through said machine.

2. A breaking machine as defined in claim 1, wherein said feeding means comprises:
   a pressure roller of supple material;
   a trough having a concave surface, said trough located adjacent said pressure roller for pressing fibers between said trough and said roller;
   a feed conveyor adjacent both said roller and said trough, said feed conveyor carrying fibers to said trough for passage between said roller and said trough; and
   a variable speed drive system connected to and driving both said conveyor and said roller, said drive system being connected to and controlled by said central control means.

3. A breaking machine as defined in claim 2 wherein said feeding means further comprises:
   a moveable carriage, said carriage being moveable between a first position adjacent said spiked disintegrator and a second position spaced from said spiked disintegrator, said carriage holding said roller and said trough thereon; and
   a drive means connected to and controlling the movement of said carriage, said drive means further being connected to and controlled by said central control means.

4. A breaking machine as defined in claim 3 wherein said drive means further comprises:
   two horizontal parallel slideways perpendicular to the axis of said disintegrator drum;
   two nuts spaced from each other and both fixed to said carriage;
   a first and a second axially fixed rotatable screw positioned parallel to said slideways, said first and second screw each engaging one of said two nuts, said first screw further being attached to a first gear and said second screw being attached to a second gear;
   a transmission shaft having a first and second worm screw formed thereon, said first worm screw engaging said first gear and said second worm screw engaging said second gear; and
   a reversible motor connected to said transmission shaft for rotation of said shaft.

5. A breaking machine as defined in claim 1 wherein said regulating means further comprises means connected to said regulating means for varying the cross-sectional area open to said fibers, said varying means being controlled by said central control means so as to regulate as required the thickness of a layer of said fibers falling onto said conveying means, said conveying means passing below said regulating means.

6. A breaking machine as defined in claim 5 wherein said varying means comprises a movable wall in said regulating means, said regulating means having an opposite wall, said movable wall being movable between a first position near said opposite wall and a second position spaced from said opposite wall;
   said regulating means having at least two opposed horizontal delivery rollers positioned between said varying means and said conveying means for delivery of fibers to said conveying means.

7. A breaking machine as defined in claim 1 wherein said regulating means is positioned below said storage shaft.

8. A breaking machine as defined in claim 2 wherein said regulating means is positioned above said disintegrator module whereby said shaft ejects fibers directly onto said feed conveyor.

9. A breaking machine as defined in claim 1 wherein:
   said regulating means further comprises a second layering means attached thereto;
   said regulating means is positioned above said disintegrator module; and
   said machine further comprises a suction channel between said regulating means and said storage means, for transporting fibers from said storage means to said regulating means.

10. A breaking machine as defined in claim 1 further comprising:
    at least two opposed horizontal delivery rollers positioned below said storage means;
    at least two opposed horizontal drawing rollers positioned below said delivery rollers and receiving said fibers from said delivery rollers;
    at least two semi-cylindrical walls each positioned adjacent a corresponding drawing roller.

11. A breaking machine as described in claim 1 wherein said storage means further comprises:
    a swinging shutter positioned in said storage means and movable between a first position directing fibers from said layering means into and through said storage means and a second position directing fibers from said layering means out of said breaking machine; and
    a double acting jack connected to said swinging shutter and moving said shutter between said first position and said second position.

12. A process for breaking fibers comprising in succession the steps of:
    (a) automatically positioning and layering said fibers for breaking;
    (b) breaking the layered fibers on a breaker;

(c) passing the broken fibers to a layering device;
(d) layering the broken fibers;
(e) passing the layered broken fibers into a storage means;
(f) storing the fibers in the storage means;
(g) enlarging the cross-sectional area of the regulating means and passing the fibers from the storage means to the regulating means;
(h) stopping the passage of fibers to the regulating means when the level of fibers in the regulating means reaches a predetermined level;
(i) returning the fibers to the breaker and decreasing the cross-sectional area of the regulating means;
(j) detecting the fibers returning to the breaker;
(k) adjusting the automatic positioning layering, and breaker such that fibers will be broken to a greater degree;
(l) repeating the above steps; and
(m) repeating steps (a)–(d) above.

* * * * *

UNITED STATES PATENT AND TRADEMARK OFFICE
CERTIFICATE OF CORRECTION

PATENT NO. : 4,278,207
DATED : July 14, 1981
INVENTOR(S) : Andre Morel

It is certified that error appears in the above—identified patent and that said Letters Patent is hereby corrected as shown below:

Column 6, line 4, delete "connectingrods" and insert ----connecting-rods----.

Column 6, after line 38, insert the title ----Operation----.

Column 6, line 39, after the word "follows", insert a colon.

Column 7, line 54, after the word "detection" insert ----cell----.

Signed and Sealed this

Twelfth Day of October 1982

[SEAL]

Attest:

Attesting Officer

GERALD J. MOSSINGHOFF
Commissioner of Patents and Trademarks